US012631720B2

(12) United States Patent
Song et al.

(10) Patent No.: US 12,631,720 B2
(45) Date of Patent: May 19, 2026

(54) RESOURCE DETERMINING METHOD AND APPARATUS, ELECTRONIC DEVICE, STORAGE MEDIUM, AND VEHICLE

(71) Applicant: Shenzhen Yinwang Intelligent Technologies Co., Ltd., Shenzhen (CN)

(72) Inventors: Sida Song, Beijing (CN); Sha Ma, Beijing (CN); Lei Gao, Beijing (CN); Hui Zhang, Beijing (CN)

(73) Assignee: Shenzhen Yinwang Intelligent Technologies Co., Ltd., Shenzhen (CN)

( * ) Notice: Subject to any disclaimer, the term of this patent is extended or adjusted under 35 U.S.C. 154(b) by 456 days.

(21) Appl. No.: 18/186,063

(22) Filed: Mar. 17, 2023

(65) Prior Publication Data

US 2023/0228841 A1    Jul. 20, 2023

Related U.S. Application Data

(63) Continuation of application No. PCT/CN2020/116129, filed on Sep. 18, 2020.

(51) Int. Cl.
G01S 7/02        (2006.01)
G01S 7/35        (2006.01)
(Continued)

(52) U.S. Cl.
CPC ............ G01S 7/023 (2013.01); G01S 7/0232 (2021.05); G01S 7/0235 (2021.05); G01S 7/35 (2013.01);
(Continued)

(58) Field of Classification Search
CPC ...... G01S 7/023; G01S 7/0235; G01S 7/0232; G01S 7/35; G01S 13/93
See application file for complete search history.

(56) References Cited

U.S. PATENT DOCUMENTS

2017/0293016 A1* 10/2017 McCloskey ........... G01S 7/0232
2018/0084429 A1*  3/2018 Guo ...................... H04W 16/14
(Continued)

FOREIGN PATENT DOCUMENTS

CN        1819496 A      8/2006
CN      106162913 A     11/2016
(Continued)

OTHER PUBLICATIONS

Ericsson, "Radio measurements for congestion control for V2X," 3GPP TSG RAN WG1 Meeting #86bis, Lisboa, Portugal, R1-1609709, CBR Measurement, Mobile Competence Centre; 650, Route Des Lucioles; F-06921 Sophia-Antipolis Cedex; France, XP051149743, Total 7 pages, 3rd Generation Partnership Project, Valbonne, France (Oct. 10-14, 2016).
(Continued)

*Primary Examiner* — William Kelleher
*Assistant Examiner* — Noah Y Min Zhu
(74) *Attorney, Agent, or Firm* — Leydig, Voit & Mayer, Ltd.

(57)        ABSTRACT

A resource determining method and apparatus, an electronic device, a storage medium, a program product, and a vehicle are provided, which are relate to interference listening and avoidance technologies of collaborative radars, and include: determining a first listening result of a first time-frequency resource set; when the first listening result meets a first congestion condition, reducing a time-frequency occupation ratio and/or transmit power of a first target detection signal to obtain a second target detection signal, wherein the first congestion condition includes: a congestion degree of any time-frequency resource in a second time-frequency resource set is greater than a first threshold, and the second time-frequency resource set is included in the first time-
(Continued)

frequency resource set; and detecting a target based on the second target detection signal.

18 Claims, 11 Drawing Sheets

(51) Int. Cl.
 *G01S 13/93* (2020.01)
 *H04W 52/24* (2009.01)
 *H04W 72/541* (2023.01)

(52) U.S. Cl.
 CPC ........... *G01S 13/93* (2013.01); *H04W 72/541* (2023.01); *H04W 52/24* (2013.01)

(56) References Cited

U.S. PATENT DOCUMENTS

| | | | | |
|---|---|---|---|---|
| 2019/0011533 | A1* | 1/2019 | Ginsburg | G01S 7/023 |
| 2019/0274065 | A1* | 9/2019 | Zhao | H04W 24/10 |
| 2019/0373609 | A1* | 12/2019 | Kim | H04W 72/541 |
| 2019/0383925 | A1* | 12/2019 | Gulati | G01S 13/325 |
| 2020/0229222 | A1* | 7/2020 | Jiang | H04W 74/04 |
| 2020/0275244 | A1* | 8/2020 | Lee | G01S 5/0284 |
| 2020/0341130 | A1* | 10/2020 | Hayashi | G01S 13/931 |
| 2021/0045130 | A1* | 2/2021 | Tang | H04W 72/29 |
| 2021/0219268 | A1* | 7/2021 | Li | H04B 17/318 |
| 2021/0315014 | A1* | 10/2021 | Gulati | H04W 24/08 |
| 2023/0014866 | A1* | 1/2023 | Song | G01S 7/0235 |

FOREIGN PATENT DOCUMENTS

| | | | | |
|---|---|---|---|---|
| CN | 107110969 | A | 8/2017 | |
| CN | 108024286 | A | 5/2018 | |
| CN | 108717179 | A | 10/2018 | |
| CN | 110557210 | A | 12/2019 | |
| CN | 111386740 | A | 7/2020 | |
| WO | WO-2017028747 | A1 * | 2/2017 | ........... H04W 72/04 |
| WO | 2020033088 | A1 | 2/2020 | |
| WO | 2020156084 | A1 | 8/2020 | |

OTHER PUBLICATIONS

Catt, "Discussion on QoS management for sidelink in NR V2X," 3GPP RAN WG1 Meeting #96bis, Xi'an, China, R1-1905357, Mobile Competence Centre; 650, Route Des Lucioles; F-06921 Sophia-Antipolis Cedex; France, XP051707431, Total 4 pages, 3rd Generation Partnership Project, Valbonne, France (Apr. 8-12, 2019).

Barneto et al., "Full-Duplex OFDM Radar With LTE and 5G NR Waveforms: Challenges, Solutions, and Measurements," IEEE Transactions on Microwave Theory and Techniques, vol. 67, No. 10, XP011748777, Total 13 pages, Institute of Electrical Electronics Engineers, New York, New York (Oct. 2019).

* cited by examiner

Determine a first listening result of a first time-frequency resource set — S101

When the first listening result meets a first congestion condition, reduce a time-frequency occupation ratio and/or transmit power of a first target detection signal to obtain a second target detection signal — S102

Detect a target based on the second target detection signal — S103

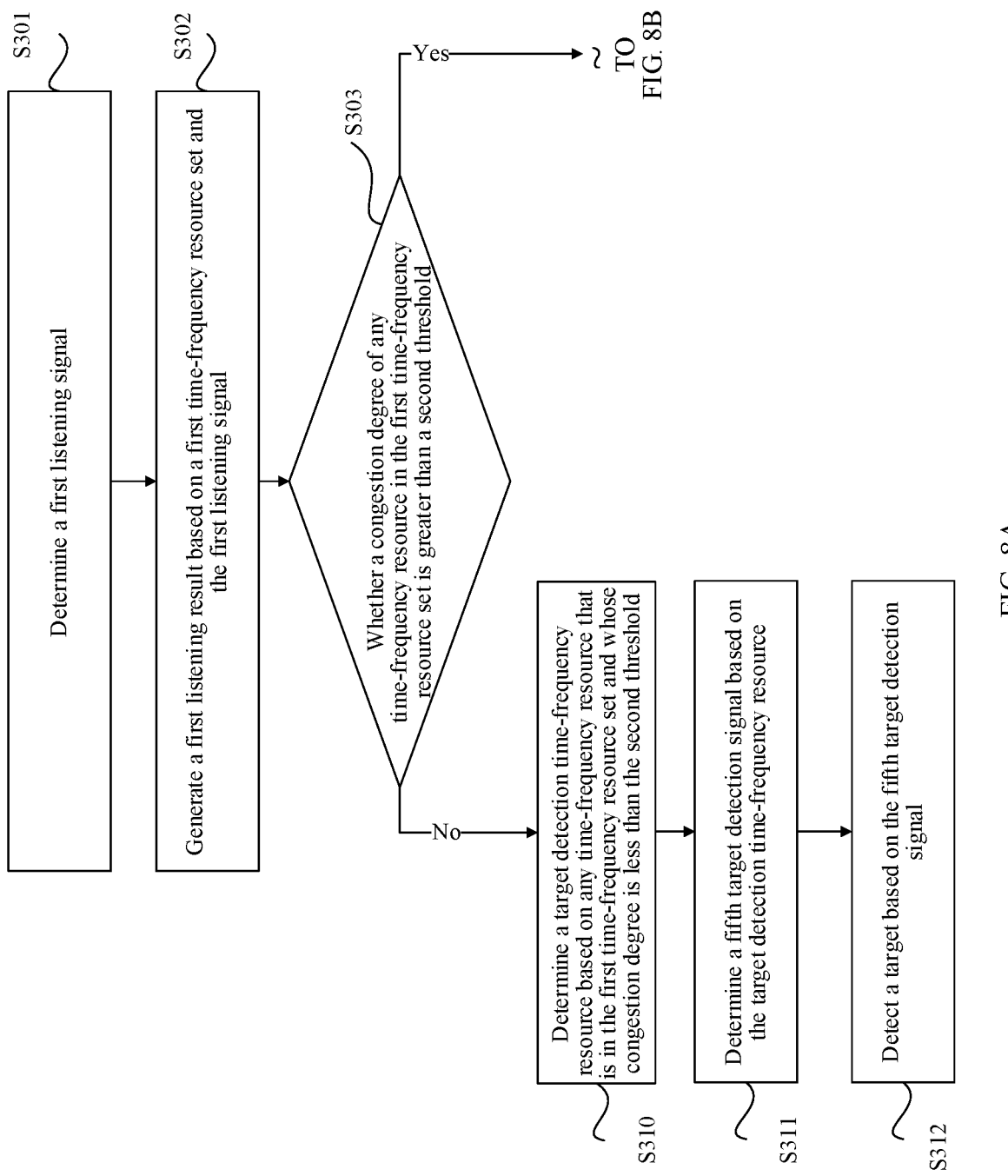

S301

Determine a first listening signal

S302

Generate a first listening result based on a first time-frequency resource set and the first listening signal

S303

Whether a congestion degree of any time-frequency resource in the first time-frequency resource set is greater than a second threshold Yes → TO FIG. 8B No

S310

Determine a target detection time-frequency resource based on any time-frequency resource that is in the first time-frequency resource set and whose congestion degree is less than the second threshold

S311

Determine a fifth target detection signal based on the target detection time-frequency resource

S312

Detect a target based on the fifth target detection signal

FIG. 8A

RESOURCE DETERMINING METHOD AND APPARATUS, ELECTRONIC DEVICE, STORAGE MEDIUM, AND VEHICLE

CROSS-REFERENCE TO RELATED APPLICATIONS

This application is a continuation of International Application No. PCT/CN2020/116129, filed on Sep. 18, 2020, the disclosure of which is hereby incorporated by reference in its entirety.

TECHNICAL FIELD

Embodiments of this application relate to the sensor field, and in particular, to a resource determining method and apparatus, an electronic device, a storage medium, a program product, and a vehicle.

BACKGROUND

With widespread application of in-vehicle radar systems, mutual interference between the radar systems becomes more serious, which greatly reduces a detection probability of the radar system or increases a false alarm probability of the radar system. This causes non-negligible impact on safety or comfort. How to reduce interference between radar systems is a problem that need be resolved. In addition, how to improve utilization of time-frequency resources for detecting a target by using a radar system becomes an urgent problem to be resolved.

In the conventional technology, a radar system may perform listening on all time-frequency resources by using a receiver disposed in the radar system, generate a listening result, and select, based on the listening result, a corresponding time-frequency resource from all time-frequency resources to detect a target.

However, with continuous increase of vehicles, available time-frequency resources are insufficient. Therefore, especially when the solution in the conventional technology is applied to a scenario in which vehicles are densely located, a problem of interference between radar systems cannot be well resolved, causing a security risk on a vehicle equipped with the radar system.

SUMMARY

To resolve the foregoing technical problem, embodiments of this application provide a resource determining method and apparatus, an electronic device, a storage medium, a program product, and a vehicle, to reduce interference between radar systems.

According to an aspect of embodiments of this application, an embodiment of this application provides a resource determining method. The method includes:

determining a first listening result of a first time-frequency resource set;

when the first listening result meets a first congestion condition, reducing a time-frequency occupation ratio and/or transmit power of a first target detection signal to obtain a second target detection signal, where the first congestion condition includes: a congestion degree of any time-frequency resource in a second time-frequency resource set is greater than a first threshold, and the second time-frequency resource set is included in the first time-frequency resource set; and detecting a target based on the second target detection signal.

In this embodiment, when the first listening result meets the first congestion condition, the second target detection signal whose time-frequency occupation ratio and/or transmit power are/is reduced is used to detect the target. This can avoid problems of an undiversified detection manner and low flexibility caused by detecting the target by using a detection signal with a fixed time-frequency occupation ratio and/or fixed transmit power in a related technology, and implement flexibility and diversity for detecting the target. In addition, when the target is detected based on the second target detection signal, because the second target detection signal is a signal whose time-frequency occupation ratio and/or transmit power are/is reduced, time-frequency resources that are occupied are reduced. In this way, technical effect of proper and full use of time-frequency resources can be implemented, and interference between radars is reduced.

In some embodiments, the method further includes:

determining whether the first listening result meets the first congestion condition.

The second congestion condition includes: a congestion degree of any time-frequency resource in the first time-frequency resource set is greater than a second threshold, where the first threshold is greater than the second threshold.

In this embodiment, if the congestion degree of any time-frequency resource in the first time-frequency resource set is greater than the second threshold, whether the first listening result meets the first congestion condition is determined, that is, whether the congestion degree of any time-frequency resource in the second time-frequency resource set in the first time-frequency resource set is greater than the first threshold is determined. The first threshold is greater than the second threshold.

In other words, if the first listening result meets the second congestion condition, and the first listening result meets the first congestion condition, the time-frequency occupation ratio and/or the transmit power of the first target detection signal are/is reduced to obtain the second target detection signal, to reduce occupied time-frequency resources. In this way, technical effect of proper and full use of time-frequency resources can be implemented.

In some embodiments, when the first listening result does not meet the second congestion condition, the method further includes:

determining a target detection time-frequency resource based on any time-frequency resource that is in the first time-frequency resource set and whose congestion degree is less than the second threshold; and determining, based on the target detection time-frequency resource, a detection signal used to detect the target.

In some embodiments, the method further includes:

determining a first listening signal.

The determining a first listening result of a first time-frequency resource set includes: generating the first listening result based on the first time-frequency resource set and the first listening signal.

The first listening signal includes a plurality of waveforms, and signal models of the plurality of waveforms are different.

In this embodiment, because the first listening signal includes the plurality of waveforms, and the signal models of the plurality of waveforms are different, diversity and flexibility of the first listening signal can be implemented. In this way, when the first listening result is generated based on the first listening signal, technical effect of comprehensiveness and integrity of the first listening result can be implemented.

In some embodiments, the signal models include frequency modulation slopes and/or system types of the plurality of waveforms.

In some embodiments, density of the plurality of waveforms in a time-frequency resource area corresponding to the first time-frequency resource set is greater than a preset density threshold.

In this embodiment, full coverage of listening may be implemented based on setting of the density threshold.

In some embodiments, the density includes time density and/or frequency density, the density threshold includes a time density threshold and/or a frequency density threshold, and that density of the plurality of waveforms in a time-frequency resource area corresponding to the first time-frequency resource set is greater than a preset density threshold includes:

the time density is greater than the time density threshold;
and/or
the frequency density is greater than the frequency density threshold.

In some embodiments, a signal model of at least one of the plurality of waveforms changes with time.

In this embodiment, a frequency modulation slope of the at least one waveform is set to a variable frequency modulation slope, so that a probability of "collision" between a listening signal and an interference signal in a period of time can be increased, that is, a probability that the listening signal and the interference signal simultaneously appear in same frequency domain can be increased, so that a success rate of detecting interference by a radar is improved.

In some embodiments, when the first listening result does not meet the first congestion condition, the method further includes:

determining a second listening result based on a third time-frequency resource set and a second listening signal, where the second listening signal includes at least two waveforms, a congestion degree of any time-frequency resource in the third time-frequency resource set is greater than the second threshold and less than the first threshold, and the third time-frequency resource set is included in the first time-frequency resource set;
determining, based on the second listening result, a waveform that is least interfered with in the at least two waveforms; and
determining, based on the waveform that is least interfered with, the detection signal used to detect the target.

In this embodiment, the detection signal is determined based on the waveform that is least interfered with, so that interference caused by another signal to the detection signal can be reduced as much as possible, and accuracy and reliability for detecting the target can be improved.

In some embodiments, the time-frequency occupation ratio includes a duty cycle of the first target detection signal in time and/or an occupation ratio of the first target detection signal in frequency.

In some embodiments, the method further includes:

selecting at least some time-frequency resources from the first time-frequency resource set according to a preset selection rule, to determine the second time-frequency resource set.

The selection rule includes: at least some time-frequency resources are selected from the first time-frequency resource set based on a preset selection parameter, and a congestion degree of any selected time-frequency resource is less than a congestion degree of an unselected time-frequency resource.

According to another aspect of embodiments of this application, an embodiment of this application further provides a resource determining apparatus. The apparatus includes:

a first determining module, configured to determine a first listening result of a first time-frequency resource set;
a reduction module, configured to: when the first listening result meets a first congestion condition, reduce a time-frequency occupation ratio and/or transmit power of a first target detection signal to obtain a second target detection signal, where the first congestion condition includes: a congestion degree of any time-frequency resource in a second time-frequency resource set is greater than a first threshold, and the second time-frequency resource set is included in the first time-frequency resource set; and
a detection module, configured to detect a target based on the second target detection signal.

In some embodiments, the apparatus further includes:

a judgment module, configured to determine whether the first listening result meets the first congestion condition.

The second congestion condition includes: a congestion degree of any time-frequency resource in the first time-frequency resource set is greater than a second threshold, where the first threshold is greater than the second threshold.

In some embodiments, when the first listening result does not meet the second congestion condition, the apparatus further includes:

a second determining module, configured to: determine a target detection time-frequency resource based on any time-frequency resource that is in the first time-frequency resource set and whose congestion degree is less than the second threshold, and determine, based on the target detection time-frequency resource, a detection signal used to detect the target.

In some embodiments, the first determining module is configured to: determine a first listening signal, and generate the first listening result based on the first time-frequency resource set and the first listening signal.

The first listening signal includes a plurality of waveforms, and signal models of the plurality of waveforms are different.

In some embodiments, the signal models include frequency modulation slopes and/or system types of the plurality of waveforms.

In some embodiments, density of the plurality of waveforms in a time-frequency resource area corresponding to the first time-frequency resource set is greater than a preset density threshold.

In some embodiments, the density includes time density and/or frequency density, the density threshold includes a time density threshold and/or a frequency density threshold, and that density of the plurality of waveforms in a time-frequency resource area corresponding to the first time-frequency resource set is greater than a preset density threshold includes:

the time density is greater than the time density threshold;
and/or
the frequency density is greater than the frequency density threshold.

In some embodiments, a signal model of at least one of the plurality of waveforms changes with time.

In some embodiments, when the first listening result does not meet the first congestion condition, the apparatus further includes:

a third determining module, configured to: determine a second listening result based on a third time-frequency resource set and a second listening signal, where the second listening signal includes at least two waveforms, a congestion degree of any time-frequency resource in the third time-frequency resource set is greater than the second threshold and less than the first threshold, and the third time-frequency resource set is included in the first time-frequency resource set; determine, based on the second listening result, a waveform that is least interfered with in the at least two waveforms; and determine, based on the waveform that is least interfered with, the detection signal used to detect the target.

In some embodiments, the time-frequency occupation ratio includes a duty cycle of the first target detection signal in time and/or an occupation ratio of the first target detection signal in frequency.

In some embodiments, the apparatus further includes:

a selection module, configured to select at least some time-frequency resources from the first time-frequency resource set according to a preset selection rule, to determine the second time-frequency resource set.

The selection rule includes: at least some time-frequency resources are selected from the first time-frequency resource set based on a preset selection parameter, and a congestion degree of any selected time-frequency resource is less than a congestion degree of an unselected time-frequency resource.

According to another aspect of embodiments of this application, an embodiment of this application further provides a computer storage medium. The computer storage medium stores computer instructions. When the computer instructions are run by a processor, the method described in any one of the foregoing embodiments is performed.

According to another aspect of embodiments of this application, an embodiment of this application further provides a computer program product. When the computer program product runs on a processor, the method described in any one of the foregoing embodiments is performed.

According to another aspect of embodiments of this application, an embodiment of this application further provides an electronic device, including:

at least one processor; and a memory communicatively connected to the at least one processor.

The memory stores computer instructions that can be executed by the at least one processor. When the computer instructions are executed by the at least one processor, the method described in any one of the foregoing embodiments is performed.

According to another aspect of embodiments of this application, an embodiment of this application further provides a vehicle, including a vehicle body and a radar system, and further including the resource determining apparatus described in any one of the foregoing embodiments.

BRIEF DESCRIPTION OF DRAWINGS

The accompanying drawings are intended for better understanding of embodiments of this application, and do not constitute any limitation on this application.

6

Figure 2:
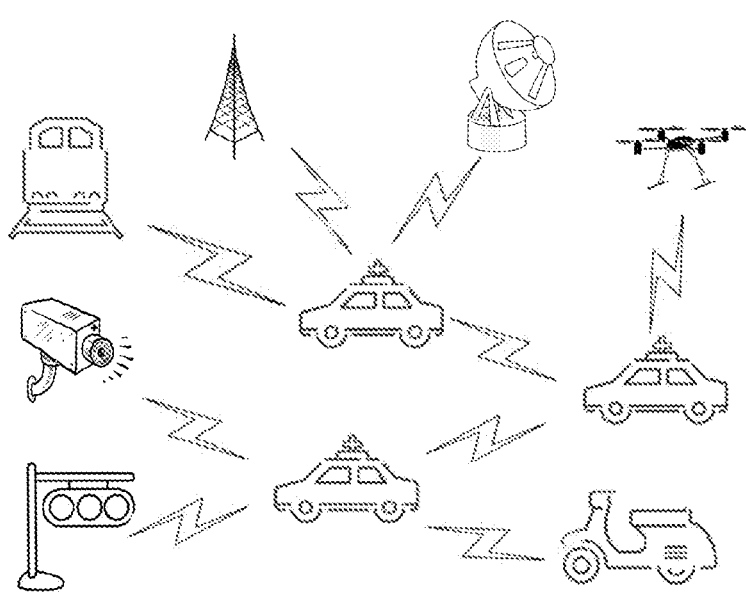
Figure 3:
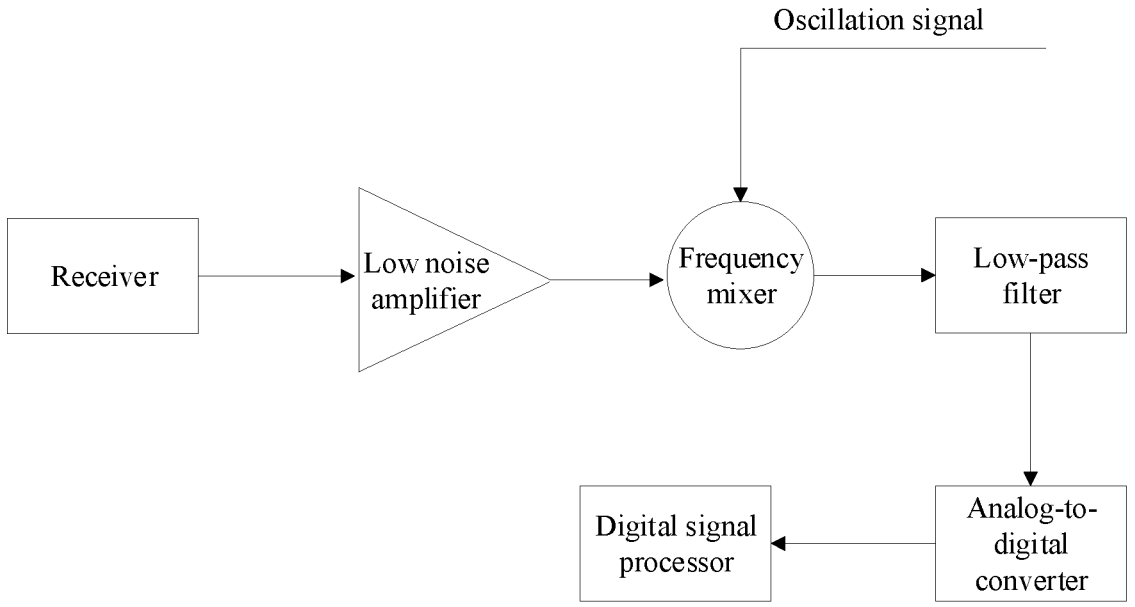
Figure 4:
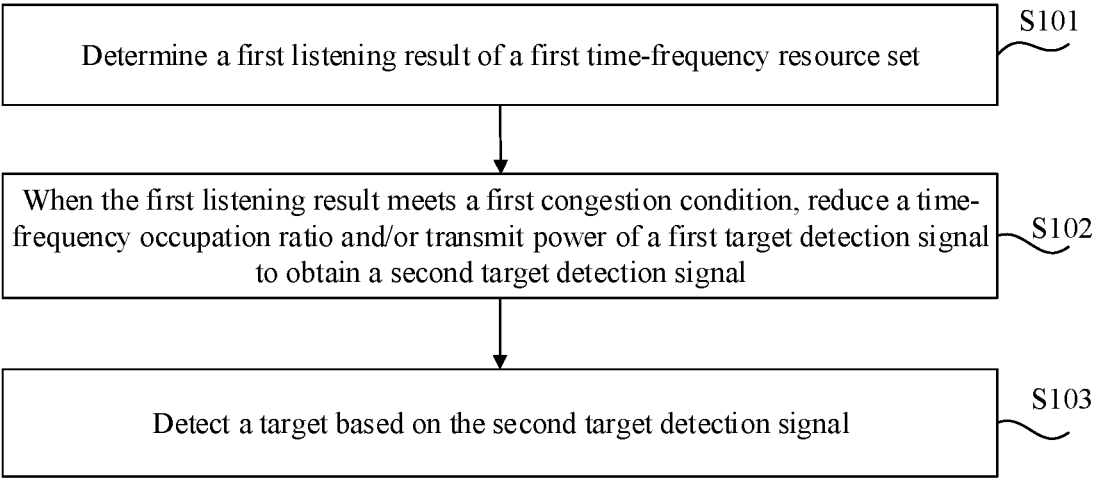
Figure 5A:
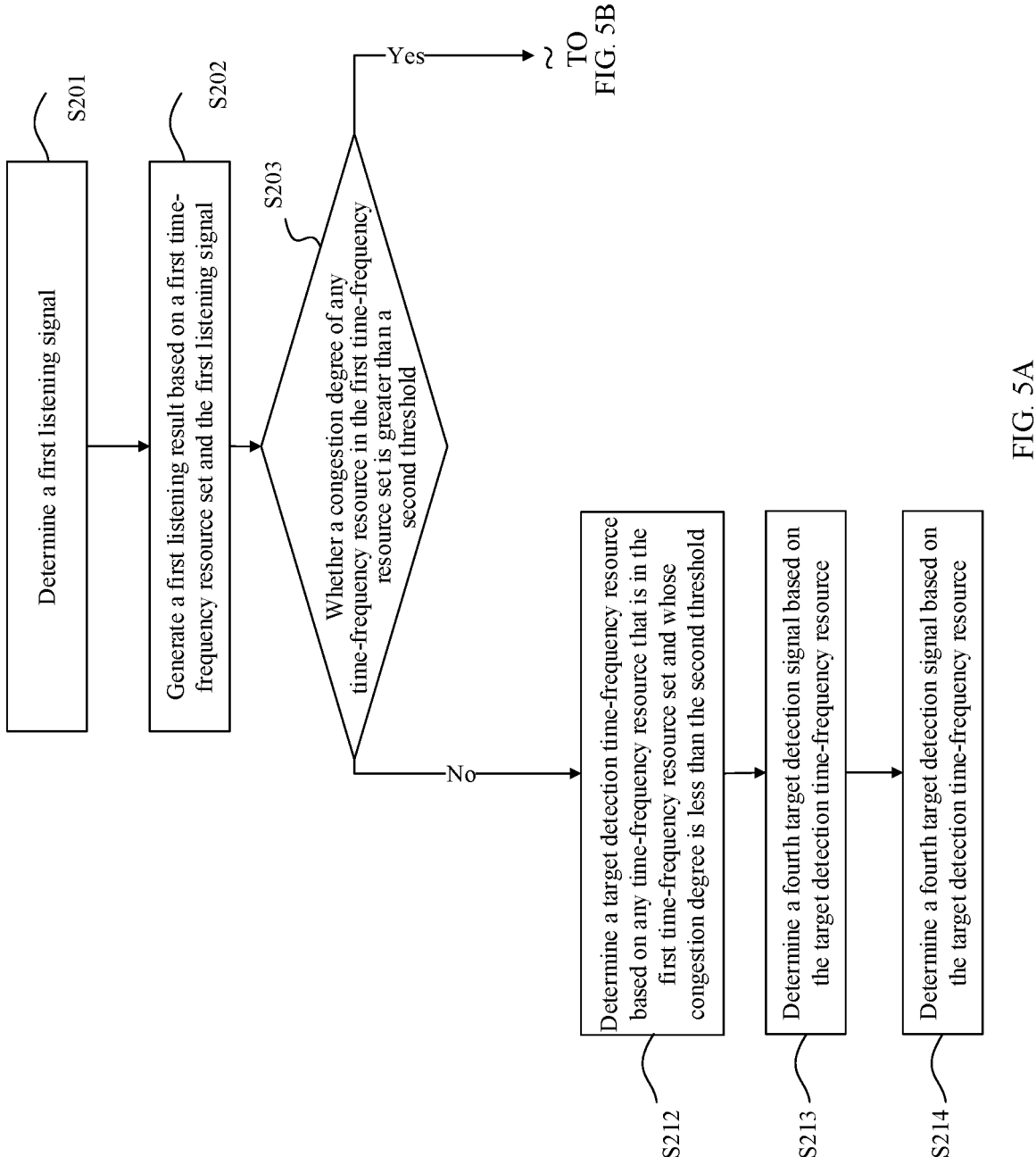
Figure 5B:
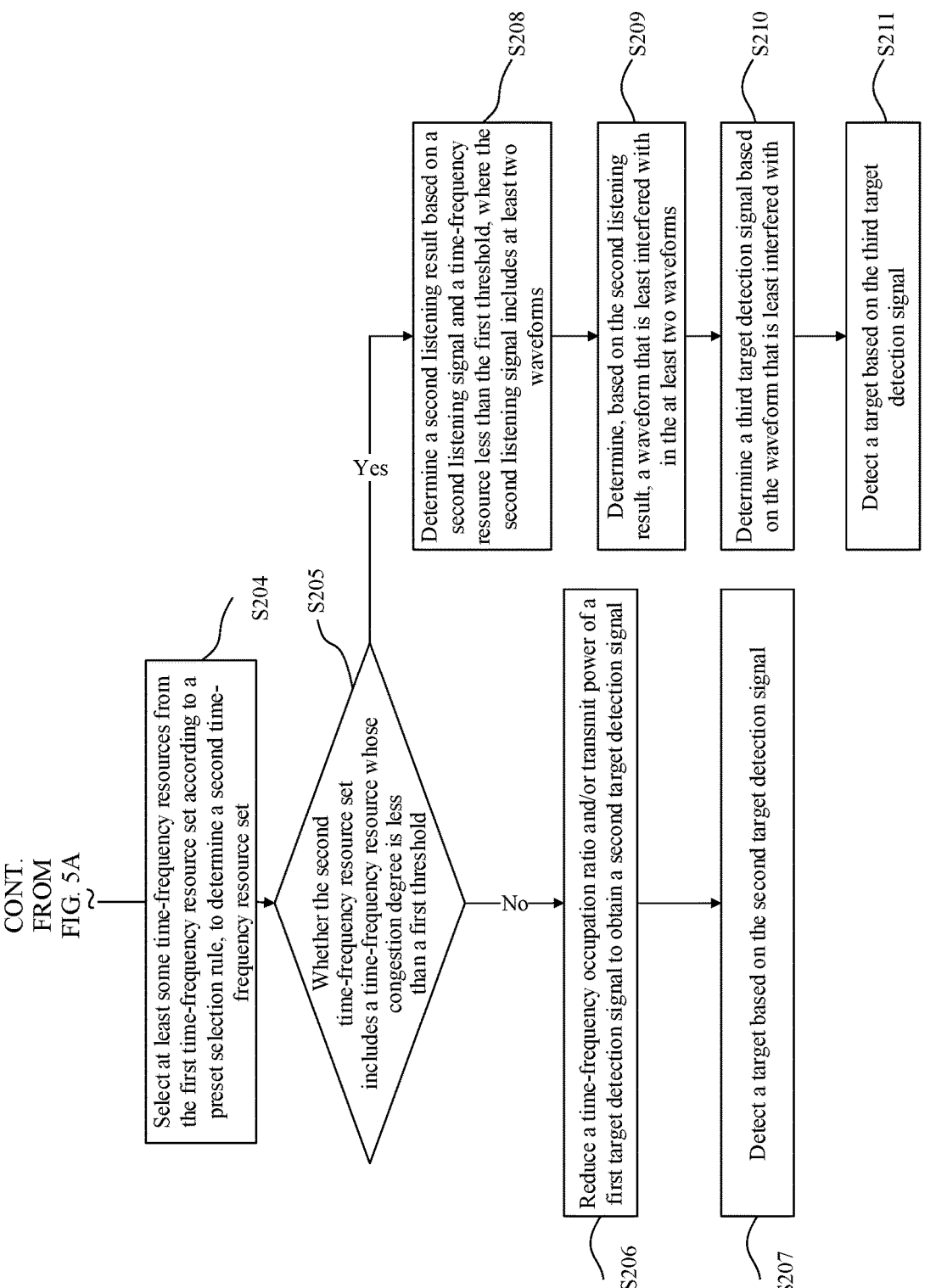
Figure 6:
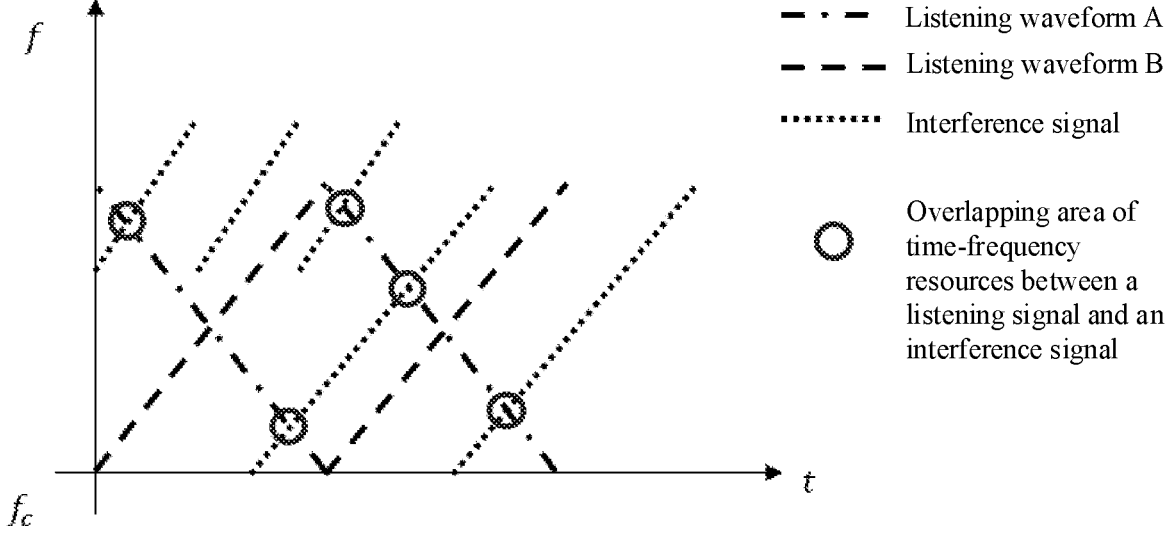
Figure 7:
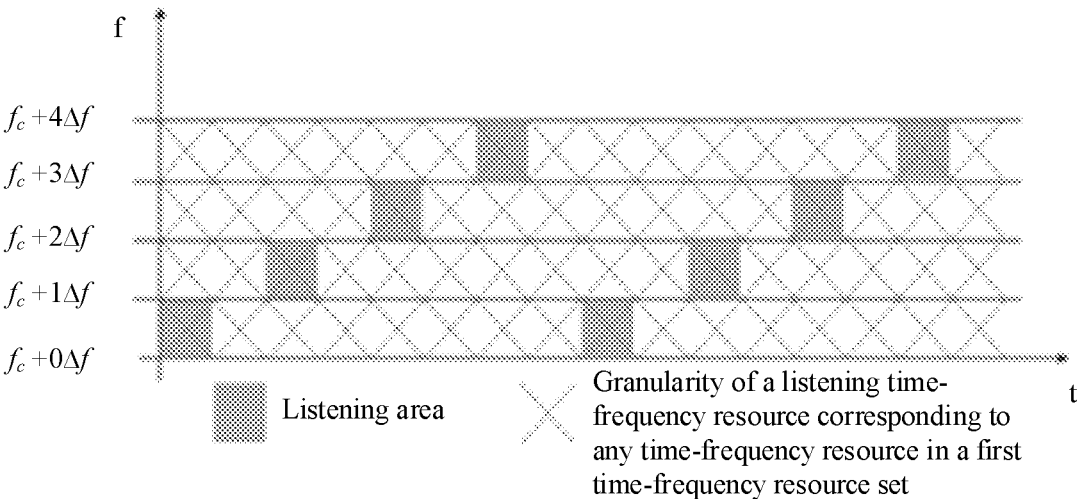
Figure 8B:
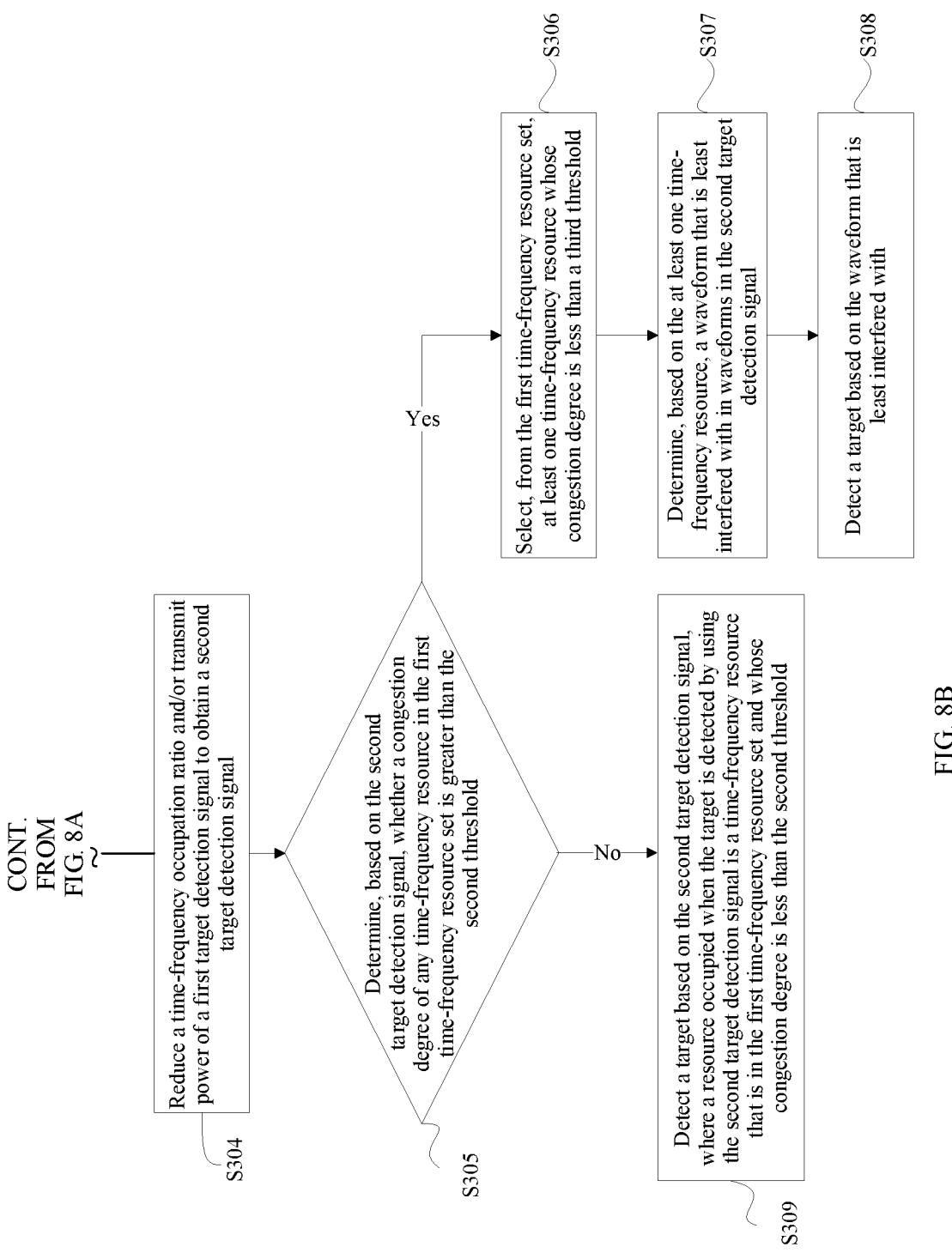
Figures 9, 10:
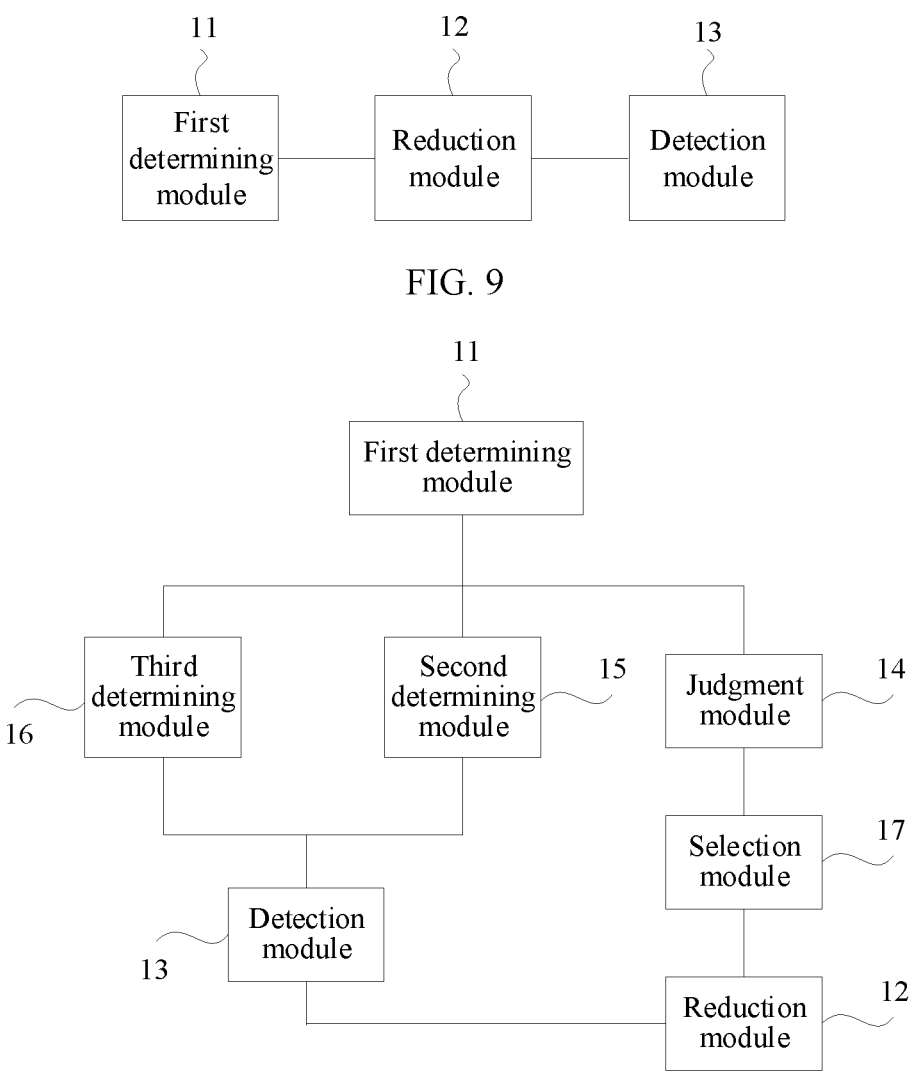
Figure 11:
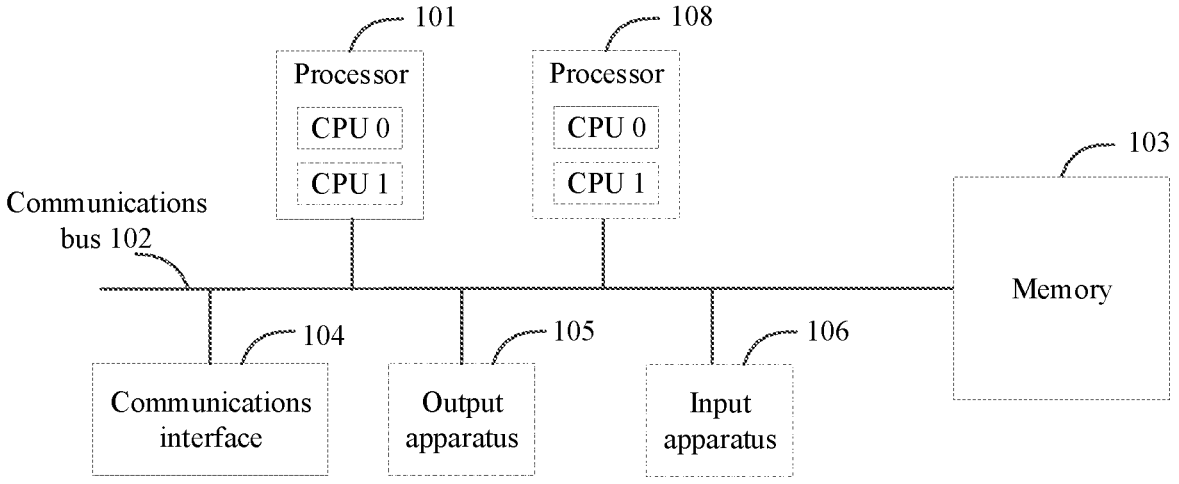
Figure 12:
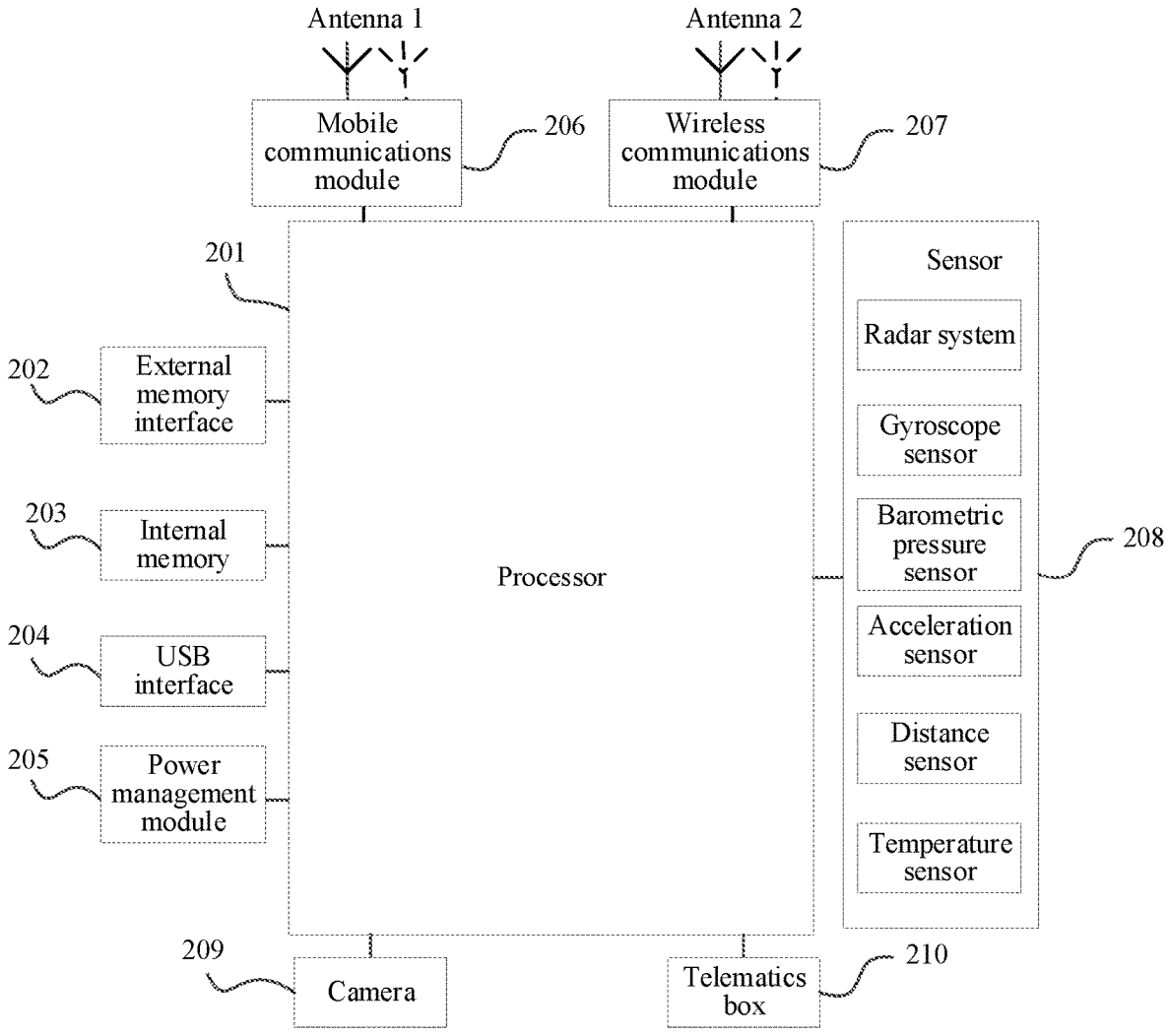

FIG. 2 is a schematic diagram of an application scenario according to an embodiment of this application;

FIG. 3 is a schematic diagram of a listening principle of a radar system according to an embodiment of this application;

FIG. 4 is a schematic flowchart of a resource determining method according to an embodiment of this application;

FIG. 5A and FIG. 5B are a schematic flowchart of a resource determining method according to another embodiment of this application;

FIG. 6 is a schematic diagram of a relationship between a listening signal and a time-frequency resource according to an embodiment of this application;

FIG. 7 is a schematic diagram of a time-frequency resource according to an embodiment of this application;

FIG. 8A and FIG. 8B are a schematic flowchart of a resource determining method according to another embodiment of this application;

FIG. 9 is a schematic diagram of a resource determining apparatus according to an embodiment of this application;

FIG. 10 is a schematic diagram of a resource determining apparatus according to another embodiment of this application;

FIG. 11 is a block diagram of an electronic device according to an embodiment of this application; and FIG. 12 is a schematic diagram of a vehicle according to an embodiment of this application.

DESCRIPTION OF EMBODIMENTS

Example embodiments are described in detail herein, and examples of the example embodiments are presented in the accompanying drawings. When the following description relates to the accompanying drawings, unless specified otherwise, same numbers in different accompanying drawings represent a same or similar element. Implementations described in the following example embodiments do not represent all implementations consistent with this application. On the contrary, the implementations are only examples of apparatuses and methods that are described in the appended claims in detail and that are consistent with some aspects of this application.

This application provides a resource determining method, and the resource determining method may be applied to a radar system.

Figure 1:
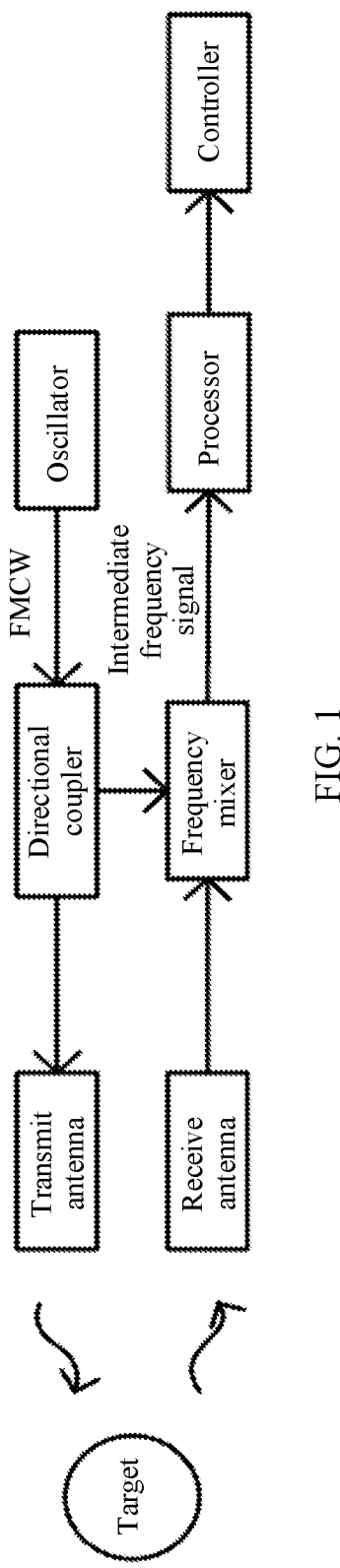
FIG. 1 is a schematic diagram of a radar system according to an embodiment of this application.

FIG. 1 is a schematic diagram of a radar system according to an embodiment of this application.

As shown in FIG. 1, the radar system may include an oscillator, a directional coupler, a transmit antenna, a receive antenna, a frequency mixer, a processor, and a controller.

The oscillator may generate a signal (such as a frequency modulated continuous wave, or FMCW) whose frequency linearly increases with time. Some signals are output by the directional coupler to the frequency mixer as local oscillator signals, and some signals are transmitted by the transmit antenna. The receive antenna receives signals reflected by targets (such as pedestrians, vehicles, and signs). The signal is mixed with the local oscillator signal in the frequency mixer to obtain an intermediate frequency signal (including information such as a relative distance, a speed, and an angle of the target). After being amplified by a low-pass filter (not shown in the figure), the intermediate frequency signal may be transmitted to the processor. The processor processes the intermediate frequency signal (after sampling the intermediate frequency signal, fast Fourier transform may be performed, and spectrum analysis may be performed), to obtain the information such as the distance, the speed, and the angle of the target. Finally, the information is output to the controller to control a behavior of a vehicle.

The radar system in embodiments of this application may be applied to a vehicle, an uncrewed aerial vehicle, a railcar, a bicycle, a signal light, a speed measurement apparatus, a base station, or the like shown in FIG. 2.

It should be noted that a type of the radar system is not limited in this application. For example, the radar system may be a millimeter-wave radar system, a laser radar system, or an ultrasonic radar system. In addition, a function of the radar system is not limited in this application. For example, the radar system may be used to measure a target, or may be used to identify a target (for example, identify a lane line and a sign). The radar system may perform path planning based on a navigator and map data.

It should be understood that when the radar system transmits a detection signal used to detect a distance to a target or the like, the detection signal needs to occupy a specific resource, for example, a time-frequency resource (including a time domain resource and a frequency domain resource). In addition, to improve reliability and accuracy for detecting the target, before the target is detected, an available time-frequency resource may be determined in a listening manner. In this way, the target is detected based on the time-frequency resource obtained through listening.

Listening may be implemented by a receive link in a radar system. A listening principle of a radar system is described by using an example with reference to FIG. 3.

As shown in FIG. 3, the receive link includes a receiver, a low noise amplifier, a frequency mixer, a low-pass filter, an analog-to-digital converter, and a digital signal processor.

The receiver is configured to receive an electromagnetic wave in space, to obtain a radio frequency receive signal.

The low noise amplifier is configured to amplify the radio frequency receive signal.

The frequency mixer is configured to perform frequency mixing processing on the amplified radio frequency receive signal and an oscillation signal (which may be provided by an oscillator).

The low-pass filter is configured to perform filtering processing on a signal obtained after the frequency mixing processing, to obtain an intermediate frequency signal.

The analog-to-digital converter is configured to perform sampling on the intermediate frequency signal to obtain an intermediate frequency sampling signal.

The digital signal processor is configured to analyze the intermediate frequency sampling signal to obtain a listening result.

However, as radar systems are widely applied to various fields, vehicles continuously increase, and time-frequency resources are fixed, how to improve utilization of the time-frequency resources becomes an urgent problem to be resolved.

After creative efforts, the inventor of this application obtains an inventive concept of this application: A time-frequency occupation ratio and/or transmit power of a detection signal used to detect a target are/is adaptively adjusted based on a listening result.

The following describes, in detail by using specific embodiments, the technical solutions of this application and how to resolve the foregoing technical problem by using the technical solutions of this application. The following several specific embodiments may be combined with each other, and a same or similar concept or process may not be described repeatedly in some embodiments. The following describes embodiments of this application with reference to the accompanying drawings.

According to an aspect, an embodiment of this application provides a resource determining method applicable to the foregoing application scenario.

FIG. 4 is a schematic flowchart of a resource determining method according to an embodiment of this application.

As shown in FIG. 4, the method includes the following steps.

S101: Determine a first listening result of a first time-frequency resource set.

It should be understood that "first" in the first time-frequency resource set is used to distinguish from a second time-frequency resource set and a third time-frequency resource set in the following, and cannot be understood as a limitation on content of the first time-frequency resource set. "First" in the first listening result is used to distinguish from a second listening result in the following, and cannot be understood as a limitation on content of the first listening result.

The first listening result may be used to represent a congestion degree that is of each time-frequency resource in the first time-frequency resource set and that is determined by a radar system based on a received electromagnetic wave and an oscillation signal in space. A congestion degree of any time-frequency resource may be understood as a quantity of radar systems that occupy the time-frequency resource, or a proportion of the time-frequency resource that is occupied. Relatively speaking, a larger quantity of radar systems that occupy the time-frequency resource, or a higher proportion of the time-frequency resource that is occupied indicates a higher congestion degree of the time-frequency resource, and a higher congestion degree indicates a higher probability that the radar system is interfered with when detecting a target, and lower reliability of a detection result.

It should be noted that a method for determining the first listening result is not limited in this embodiment. For example, for a principle of determining the first listening result, refer to FIG. 3.

S102: When the first listening result meets a first congestion condition, reduce a time-frequency occupation ratio and/or transmit power of a first target detection signal to obtain a second target detection signal.

The first congestion condition includes: A congestion degree of any time-frequency resource in the second time-frequency resource set is greater than a first threshold, and the second time-frequency resource set is included in the first time-frequency resource set.

Similarly, "first" in the first target detection signal is used to distinguish from the second target detection signal, and cannot be understood as a limitation on content of the first target detection signal. "Second" in the second target detection signal is used to distinguish from the first target detection signal, and cannot be understood as a limitation on content of the second target detection signal. "Second" in the second time-frequency resource set is used to distinguish from the first time-frequency resource set, and cannot be understood as a limitation on content of the second time-frequency resource set.

The first target detection signal may be understood as a detection signal that is preset by the radar system and that is to be used to detect a target, and the second target detection signal may be understood as a detection signal obtained after the radar system reduces the time-frequency occupation ratio and/or the transmit power of the first target detection signal.

The time-frequency occupation ratio may be used to represent a duty cycle of the first target detection signal in time, or may be used to represent an occupation ratio of the first target detection signal in frequency, or may be used to represent a duty cycle of the first target detection signal in time and an occupation ratio of the first target detection signal in frequency.

The first threshold may be set based on a preset detection requirement that meets the radar system, and the detection requirement may be used to represent a requirement for reliability of a detection result. For example, for a detection scenario that needs higher reliability of a detection result, the radar system may set the first threshold to a smaller value, and for a detection scenario that needs lower reliability of a detection result, the radar system may set the first threshold to a larger value.

S102 may specifically include: Whether the first listening result meets the first congestion condition is determined. If the first listening result meets the first congestion condition, the time-frequency occupation ratio and/or the transmit power of the first target detection signal are/is reduced to obtain the second target detection signal, so that when the target is detected based on the second target detection signal, because the second target detection signal is a signal whose time-frequency occupation ratio and/or transmit power are/is reduced, time-frequency resources that are occupied are reduced. In this way, technical effect of proper and full use of time-frequency resources can be implemented.

S103: Detect the target based on the second target detection signal.

Based on the foregoing analysis, it can be learned that this embodiment provides a resource determining method. The method includes: determining the first listening result of the first time-frequency resource set; when the first listening result meets the first congestion condition, reducing the time-frequency occupation ratio and/or the transmit power of the first target detection signal to obtain the second target detection signal, where the first congestion condition includes: the congestion degree of any time-frequency resource in the second time-frequency resource set is greater than the first threshold, and the second time-frequency resource set is included in the first time-frequency resource set; detecting the target based on the second target detection signal; and when the first listening result meets the first congestion condition, detecting the target by using the second target detection signal whose time-frequency occupation ratio and/or transmit power are/is reduced. This can avoid problems of an undiversified detection manner and low flexibility caused by detecting the target by using a detection signal with a fixed time-frequency occupation ratio and/or fixed transmit power in a related technology, and implement flexibility and diversity for detecting the target. In addition, when the target is detected based on the second target detection signal, because the second target detection signal is a signal whose time-frequency occupation ratio and/or transmit power are/is reduced, time-frequency resources that are occupied and/or transmit power are/is reduced. In this way, technical effect of proper and full use of time-frequency resources can be implemented.

The following provides a listening and detecting process according to another embodiment of this application, and is described in detail with reference to FIG. 5A and FIG. 5B.

As shown in FIG. 5A and FIG. 5B, the method includes the following steps.

S201: Determine a first listening signal, where the first listening signal includes a plurality of waveforms, and signal models of the plurality of waveforms are different.

The signal model may be used to show a feature of a waveform, for example, a system type of a waveform, and the system type of the waveform may include a continuous waveform, a pulse signal waveform, and the like, and for another example, a frequency modulation slope of the waveform.

Similarly, "first" in the first listening signal is used to distinguish from a second listening signal in the following, and cannot be understood as a limitation on content of the first listening signal. In addition, the first listening signal may be used to represent a waveform used by a radar system to listen to a time-frequency resource. In other words, in this embodiment, the radar system may listen to the time-frequency resource by using the plurality of waveforms.

S202: Generate a first listening result based on a first time-frequency resource set and the first listening signal.

In some embodiments, frequency modulation slopes of the plurality of waveforms are different.

An example in which the first listening signal includes two waveforms is used to describe a relationship between a listening signal and a time-frequency resource with reference to FIG. 6.

As shown in FIG. 6, the first listening signal includes two waveforms: a listening waveform A and a listening waveform B. Frequency modulation slopes of the listening waveform A and the listening waveform B are different. An interference signal may be an electromagnetic wave in space that is received by the radar system.

As shown in FIG. 6, the listening waveform A and the listening waveform B may respectively have overlapping areas (areas represented by circles shown in FIG. 6) with the interference signal in time domain t and frequency domain f, and the overlapping areas are time-frequency resources that are occupied.

In some other embodiments, several listening areas may be selected in a time division manner and/or a frequency division manner to perform listening.

That several listening areas are selected in a time division manner for listening may be understood as follows: The first time-frequency resource set includes a plurality of time domain resource areas, the plurality of time domain resource areas are obtained by dividing available time-frequency resources by the radar system at a time domain resource granularity, and the plurality of time domain resource areas are the several listening areas.

That several listening areas are selected in a frequency division manner for listening may be understood as follows: The first time-frequency resource set includes a plurality of frequency domain resource areas, the plurality of frequency domain resource areas are obtained by dividing available frequency domain resources by the radar system at a frequency domain resource granularity, and the plurality of frequency domain resource areas are the several listening areas.

That several listening areas are selected in a time division manner and a frequency division manner for listening may be understood as follows: The first time-frequency resource set includes a plurality of time-frequency resource areas, the plurality of time-frequency resource areas are obtained by dividing available time-frequency resources by the radar system at a time-frequency resource granularity, and the plurality of time-frequency resource areas are the several listening areas.

As shown in FIG. 7, "X" in a dotted line in FIG. 7 may be understood as a granularity (which may be specified in a protocol, or may be preset based on a requirement) of a listening time-frequency resource corresponding to any time-frequency resource in the first time-frequency resource set, that is, may be understood as a unit area of at least some areas that may be covered by any time-frequency resource in the first time-frequency resource set. The radar system may listen to a congestion degree of the time-frequency resource in at least one unit area. In addition, a unit area framed by each "rectangle" in FIG. 7 may be understood as several listening areas that can be selected by the radar system from the at least some areas.

In some other embodiments, a signal model of at least one of the plurality of waveforms changes with time.

For example, if a signal model of the waveform A changes with time, it may be represented that the frequency modulation slope of the waveform A is a variable frequency modulation slope.

The radar system sets a frequency modulation slope of at least one waveform to a variable frequency modulation slope, so that a probability of "collision" between a listening signal and an interference signal in a period of time can be increased, that is, a probability that the listening signal and the interference signal simultaneously appear in same frequency domain can be increased, so that a success rate of detecting interference by a radar is improved.

In some other embodiments, density of the plurality of waveforms in a time-frequency resource area corresponding to the first time-frequency resource set is greater than a preset density threshold.

The density may be understood from a time dimension and/or a frequency dimension. Understanding from the time dimension may be as follows: In a unit of frequency band, along a time axis, a quantity of repetition cycles of the first listening signal is greater than a threshold. Understanding from the frequency dimension may be as follows: In a unit of time, along a frequency axis, a quantity of repetition cycles of the first listening signal is greater than a threshold.

In other words, the density includes time density and/or frequency density, the density threshold includes a time density threshold and/or a frequency density threshold, and that density of the plurality of waveforms in a time-frequency resource area corresponding to the first time-frequency resource set is greater than a preset density threshold includes:

the time density is greater than the time density threshold; and/or the frequency density is greater than the frequency density threshold.

It can be learned with reference to FIG. 7 that larger time density/or frequency density indicates higher listening reliability.

S203: Determine, based on the first listening result, whether a congestion degree of any time-frequency resource in the first time-frequency resource set is greater than a second threshold (that is, determine whether the first listening result meets a second congestion condition); and if the congestion degree of any time-frequency resource in the first time-frequency resource set is greater than the second threshold, perform S204; or if the congestion degree of any time-frequency resource in the first time-frequency resource set is not greater than the second threshold, perform S212.

Similarly, the second threshold may be set based on the foregoing principle of setting the first threshold. Details are not described herein again. The second threshold is less than the first threshold.

In other words, in this embodiment, the radar system may determine a congestion degree of each time-frequency resource in the first time-frequency resource set based on the first listening result, and compare the congestion degree of each time-frequency resource in the first time-frequency resource set with the second threshold. If the congestion degree of each time-frequency resource in the first time-frequency resource set is greater than the second threshold, S204 is performed.

For example, the first time-frequency resource set includes m time-frequency resources, and each of the m time-frequency resources corresponds to a congestion degree. To be specific, m congestion degrees are obtained. Whether each of the m congestion degrees is greater than the second threshold is determined. If each of the m congestion degrees is greater than the second threshold, S204 is performed.

A congestion degree x % of a time-frequency resource in the first time-frequency resource set may be calculated based on Formula 1. Formula 1 is presented as follows:

$$x\% = \frac{\sum_i B_{busy,i} \times T_{busy,i}}{B_L \times T_L}$$

$B_L$ is a frequency range of a time-frequency resource in the first time-frequency resource set to which the radar system listens. $T_L$ is a time range of a time-frequency resource in the first time-frequency resource set to which the radar system listens. $B_{busy,i}$ is a frequency range of the $i^{th}$ unit of an occupied time-frequency resource determined by the radar system based on the first listening result. $T_{busy,i}$ is a time range of the $i^{th}$ unit of the occupied time-frequency resource determined by the radar system based on the first listening result. The unit of the time-frequency resource is a minimum unit of a time-frequency resource constituting each time-frequency resource in the first time-frequency resource set, and may be specified in a protocol or configured before delivery. This is not limited.

S204: Select at least some time-frequency resources from the first time-frequency resource set according to a preset selection rule, to determine a second time-frequency resource set.

The selection rule includes: at least some time-frequency resources are selected from the first time-frequency resource set based on a preset selection parameter, and a congestion degree of any selected time-frequency resource is less than a congestion degree of an unselected time-frequency resource.

In other words, if the radar system determines that the first listening result meets the second congestion condition, the radar system selects the at least some time-frequency resources from the first time-frequency resource set, and a set constituted by combining selected time-frequency resources is the second time-frequency resource combination.

In some embodiments, the selection parameter may include a preset selection threshold and a preset proportion threshold.

The selection threshold may be understood as a quantity of the at least some time-frequency resources selected by the radar system, for example, 10. A method for selecting the at least some time-frequency resources by the radar system is described below by using an example of the selection threshold.

The radar system may sort the time-frequency resources in the first time-frequency resource set in ascending order of congestion degrees, to obtain an ascending sequence, and select the top 10 time-frequency resources from the ascending sequence based on the selection threshold (for example, 10). The 10 time-frequency resources are the at least some selected time-frequency resources, and a time-frequency resource set constituted by combining the 10 time-frequency resources is the second time-frequency resource set.

Certainly, the radar system may alternatively sort the time-frequency resources in the first time-frequency resource set in descending order of congestion degrees, to obtain a descending sequence, and select the last 10 time-frequency resources from the descending sequence based on the selection threshold (for example, 10). The 10 time-frequency resources are the at least some selected time-frequency resources, and a time-frequency resource set constituted by combining the 10 time-frequency resources is the second time-frequency resource set.

The selection proportion may be understood as a percentage of the at least some time-frequency resources selected by the radar system, for example, 5%. A method for selecting the at least some time-frequency resources by the radar system is described below by using an example of the selection proportion.

The radar system may sort time-frequency resources in the first time-frequency resource set in ascending order of congestion degrees, to obtain an ascending sequence, and select the top 5% time-frequency resources from the ascending sequence based on the selection proportion (for example, 5%). The 5% time-frequency resources are the at least some selected time-frequency resources, and a time-frequency resource set constituted by combining the 5% time-frequency resources is the second time-frequency resource set.

Certainly, the radar system may alternatively sort the time-frequency resources in the first time-frequency resource set in descending order of congestion degrees, to obtain a descending sequence, and select the last 5% time-frequency resources from the descending sequence based on the selection proportion (for example, 5%). The 5% time-frequency resources are the at least some selected time-frequency resources, and a time-frequency resource set constituted by combining the 5% time-frequency resources is the second time-frequency resource set.

It should be noted that the foregoing selection threshold and selection proportion are merely used for example description, and cannot be understood as a limitation on the selection threshold and the selection proportion. The selection threshold and the selection proportion may be set by the radar system based on a requirement, a historical record, a test, and the like.

S205: Determine, based on the first listening result, whether the second time-frequency resource set includes a time-frequency resource whose congestion degree is less than a first threshold (that is, determine whether a first congestion condition is met); and if the second time-frequency resource set does not include a time-frequency resource whose congestion degree is less than the first threshold, perform S206 to S207; or if the second time-frequency resource set includes a time-frequency resource whose congestion degree is less than the first threshold, perform S208 to S211.

S206: Reduce a time-frequency occupation ratio and/or transmit power of a first target detection signal to obtain a second target detection signal.

S207: Detect a target based on the second target detection signal.

For description of S206 to S207, refer to the foregoing embodiment. Details are not described herein again.

In addition, in some embodiments, a time-frequency occupation ratio of a target detection signal may be calculated based on Formula 2. Formula 2:

$$y\% = \frac{\sum_k^K B_k \times T_k}{B_{Max} \times T_{refreshCycle}}$$

$B_{Max}$ is a maximum frequency range occupied by a detection signal with a maximum sweeping bandwidth that can be generated by the radar system when detecting a target. $T_{refreshCycle}$ is a refresh cycle of the radar system. $B_k$ is a signal bandwidth of the $k^{th}$ cycle of the radar system. $T_k$ is a signal time width of the $k^{th}$ cycle of the radar system. K is a quantity of cycles for coherent accumulation of the radar.

The refresh cycle includes duration for at least one time of target detection (for example, a target is detected in at least one piece of activation duration) and/or duration for at least one time of signal processing (for example, at least one piece of silence duration or an idle time period, where in the silence duration or the signal processing process, the radar system does not transmit a detection signal, and therefore the duration belongs to the "idle time period").

In some embodiments, the refresh cycle may be periodically set, for example, 50 ms (for example, activation duration of 20 ms+silence duration of 30 ms), or may be another value. Specifically, for each refresh cycle that is periodically performed, activation duration or silence duration included in the refresh cycle may be the same or different. For example, a current refresh cycle (whose duration is 50 ms) includes activation duration of 20 ms and silence duration of 30 ms, and a next refresh cycle in time domain may include activation duration of 30 ms and silence duration of 20 ms, or may include silence duration of 50 ms (this refresh cycle may be referred to as a silence refresh cycle).

The activation duration may be a time range in which the radar system detects a target, or may be referred to as a transmission time period. Specifically, the activation duration is usually continuous duration. This application may alternatively cover a scenario in which the activation duration is discontinuous duration. This is not specifically limited. Activation duration of different radar systems may be different, and is usually at a millisecond (ms) level, for example, 10 ms or 20 ms. Relatively speaking, longer activation duration indicates better target detection performance of the radar system.

In some embodiments, the activation duration may be limited by a length of the refresh cycle and a length of the silence duration. For example, the radar system completes target detection and signal processing in a refresh cycle. The target detection and signal processing may be performed in sequence, or may be performed at the same time. This is not limited in this application.

The activation duration may be represented by $$\sum_k^K T_k,$$

that is, the activation duration is a sum of time widths of all cycles of the detection signal of the radar system.

It should be noted that the refresh cycle and/or the activation duration may be set by the radar system based on a requirement, a historical record, a test, and the like. This is not limited in this application.

S208: Determine a second listening result based on a second listening signal and a time-frequency resource less than the first threshold (that is, a third time-frequency resource set, where a congestion degree of any time-frequency resource in the third time-frequency resource set is greater than the second threshold and less than the first threshold, and the third time-frequency resource set is included in the first time-frequency resource set), where the second listening signal includes at least two waveforms.

Similarly, "third" in the third time-frequency resource set is used to distinguish from the first time-frequency resource set and the second time-frequency resource set, and cannot be understood as a limitation on content of the third time-frequency resource set. "Second" in the second listening signal is used to distinguish from the first listening signal, and cannot be understood as a limitation on content of the first listening signal.

S209: Determine, based on the second listening result, a waveform that is least interfered with in the at least two waveforms.

S210: Determine a third target detection signal based on the waveform that is least interfered with.

S211: Detect a target based on the third target detection signal.

Similarly, "third" in the third target detection signal is used to distinguish from the first target detection signal and the like, and cannot be understood as a limitation on content of the third target detection signal.

It should be noted that each waveform has its own feature. For a same interference signal, each waveform may be interfered with to a different degree. In other words, some waveforms are interfered with to a severe degree, and some waveforms are interfered with to a slight degree. In this embodiment, at least two waveforms may be used to listen to a time-frequency resource greater than the second threshold, that is, a plurality of waveforms are used to listen to a time-frequency resource greater than the second threshold. A waveform that is least interfered with in the plurality of waveforms is determined based on the listening result, and the third target detection signal is determined based on the waveform. This can avoid, as much as possible, a disadvantage of low accuracy of a detection result caused by interference happening when the target is detected by using the third target detection signal. In this way, accuracy and reliability for detecting the target are improved.

S212: Determine a target detection time-frequency resource based on any time-frequency resource that is in the first time-frequency resource set and whose congestion degree is less than the second threshold.

Based on the foregoing analysis, if the radar system determines that congestion degrees of the at least some time-frequency resources in the first time-frequency resource set are less than the second threshold, the radar system may determine the target detection time-frequency resource based on the at least some time-frequency resources.

The radar system may randomly select one time-frequency resource from the at least some time-frequency resources to determine the target detection time-frequency resource, or may select a time-frequency resource with a minimum congestion degree from the at least some time-frequency resources to determine the target detection time-frequency resource, or may select one time-frequency resource from the at least some time-frequency resources based on detection performance of the radar system to determine the target detection time-frequency resource. This is not limited in this embodiment.

S213: Determine a fourth target detection signal based on the target detection time-frequency resource.

S214: Detect a target based on the fourth target detection signal.

Similarly, "fourth" in the fourth target detection signal is used to distinguish from the first target detection signal and the like, and cannot be understood as a limitation on content of the fourth target detection signal.

For example, a time-frequency range occupied by a waveform used for the fourth target detection signal does not exceed the target detection time-frequency resource. For another example, the fourth target detection signal is a detection signal by using which the target is detected at a time point closet to a current time point.

It should be noted that, in some embodiments, after performing S206, the radar system may determine a listening result of a time-frequency resource set obtained after a time-frequency occupation ratio is reduced. For specific implementation, refer to the foregoing implementation principle. Details are not described herein again.

In some other embodiments, the radar system may further obtain, when determining that the first listening result does not meet the second congestion condition, the second target detection signal used to detect the target. An example is provided for description with reference to FIG. 8A and FIG. 8B. In this embodiment, content that is the same as that in the foregoing embodiment is not described again.

As shown in FIG. 8A and FIG. 8B, the method includes the following steps.

S301: Determine a first listening signal, where the first listening signal includes a plurality of waveforms, and signal models of the plurality of waveforms are different.

S302: Generate a first listening result based on a first time-frequency resource set and the first listening signal.

S303: Determine, based on the first listening result, whether a congestion degree of any time-frequency resource in the first time-frequency resource set is greater than a second threshold; and if the congestion degree of any time-frequency resource in the first time-frequency resource set is greater than the second threshold, perform S304; or if the congestion degree of any time-frequency resource in the first time-frequency resource set is not greater than the second threshold, perform S310 to S312.

S304: Reduce a time-frequency occupation ratio and/or transmit power of a first target detection signal to obtain a second target detection signal.

S305: Determine, based on the second target detection signal, whether a congestion degree of any time-frequency resource in the first time-frequency resource set is greater than the second threshold; and if the congestion degree of any time-frequency resource in the first time-frequency resource set is greater than the second threshold, perform S306 to S308, or if the congestion degree of any time-frequency resource in the first time-frequency resource set is not greater than the second threshold, perform S309.

S306: Select, from the first time-frequency resource set, at least one time-frequency resource whose congestion degree is less than a third threshold.

Similarly, the third threshold may be set based on the foregoing principle of setting the first threshold. Details are not described herein again. The third threshold may be equal to the first threshold.

S307: Determine, based on the at least one time-frequency resource, a waveform that is least interfered with in waveforms in the second target detection signal.

S308: Detect a target based on the waveform that is least interfered with.

S309: Detect a target based on the second target detection signal, where a resource occupied when the target is detected by using the second target detection signal is a time-frequency resource that is in the first time-frequency resource set and whose congestion degree is less than the second threshold.

S310: Determine a target detection time-frequency resource based on any time-frequency resource that is in the first time-frequency resource set and whose congestion degree is less than the second threshold.

S311: Determine a fifth target detection signal based on the target detection time-frequency resource.

S312: Detect a target based on the fifth target detection signal.

According to another aspect of embodiments of this application, an embodiment of this application further provides a resource determining apparatus, configured to perform the resource determining method described in any one of the foregoing embodiments, for example, configured to perform the resource determining method shown in any one of the embodiments in FIG. 4, FIG. 5A and FIG. 5B, and FIG. 8A and FIG. 8B.

FIG. 9 is a schematic diagram of a resource determining apparatus according to an embodiment of this application.

As shown in FIG. 9, the apparatus includes:

a first determining module 11, configured to determine a first listening result of a first time-frequency resource set;

a reduction module 12, configured to: when the first listening result meets a first congestion condition, reduce a time-frequency occupation ratio and/or transmit power of a first target detection signal to obtain a second target detection signal, where the first congestion condition includes: a congestion degree of any time-frequency resource in a second time-frequency resource set is greater than a first threshold, and the second time-frequency resource set is included in the first time-frequency resource set; and a detection module 13, configured to detect a target based on the second target detection signal.

It can be learned with reference to FIG. 10 that, in some embodiments, the apparatus further includes:

a judgment module 14, configured to determine whether the first listening result meets the first congestion condition.

The second congestion condition includes: a congestion degree of any time-frequency resource in the first time-frequency resource set is greater than a second threshold, where the first threshold is greater than the second threshold.

It can be learned with reference to FIG. 10 that, in some embodiments, when the first listening result does not meet the second congestion condition, the apparatus further includes:

a second determining module 15, configured to: determine a target detection time-frequency resource based on any time-frequency resource that is in the first time-frequency resource set and whose congestion degree is less than the second threshold, and determine, based on the target detection time-frequency resource, a detection signal used to detect the target.

In some embodiments, the first determining module 11 is configured to: determine a first listening signal, and generate the first listening result based on the first time-frequency resource set and the first listening signal.

The first listening signal includes a plurality of waveforms, and signal models of the plurality of waveforms are different.

In some embodiments, the signal models include frequency modulation slopes and/or system types of the plurality of waveforms.

In some embodiments, density of the plurality of waveforms in a time-frequency resource area corresponding to the first time-frequency resource set is greater than a preset density threshold.

In some embodiments, the density includes time density and/or frequency density, the density threshold includes a time density threshold and/or a frequency density threshold, and that density of the plurality of waveforms in a time-frequency resource area corresponding to the first time-frequency resource set is greater than a preset density threshold includes:

the time density is greater than the time density threshold; and/or the frequency density is greater than the frequency density threshold.

In some embodiments, a signal model of at least one of the plurality of waveforms changes with time.

It can be learned with reference to FIG. 10 that, in some embodiments, when the first listening result does not meet the first congestion condition, the apparatus further includes:

a third determining module 16, configured to: determine a second listening result based on a third time-frequency resource set and a second listening signal, where the second listening signal includes at least two waveforms, a congestion degree of any time-frequency resource in the third time-frequency resource set is greater than the second threshold and less than the first threshold, and the third time-frequency resource set is included in the first time-frequency resource set; determine, based on the second listening result, a waveform that is least interfered with in the at least two waveforms; and determine, based on the waveform that is least interfered with, the detection signal used to detect the target.

In some embodiments, the time-frequency occupation ratio includes a duty cycle of the first target detection signal in time and/or an occupation ratio of the first target detection signal in frequency.

It can be learned with reference to FIG. 10 that, in some embodiments, the apparatus further includes:

a selection module 17, configured to select at least some time-frequency resources from the first time-frequency resource set according to a preset selection rule, to determine the second time-frequency resource set.

The selection rule includes: at least some time-frequency resources are selected from the first time-frequency resource set based on a preset selection parameter, and a congestion degree of any selected time-frequency resource is less than a congestion degree of an unselected time-frequency resource.

According to another aspect of embodiments of this application, an embodiment of this application further provides a computer storage medium. The computer storage medium stores computer instructions. When the computer instructions are run by a processor, the method described in any one of the foregoing embodiments is performed, for example, the resource determining method shown in any one of the embodiments in FIG. 4, FIG. 5A and FIG. 5B, and FIG. 8A and FIG. 8B is performed.

According to another aspect of embodiments of this application, an embodiment of this application further provides a computer program product. When the computer program product runs on a processor, the method described in any one of the foregoing embodiments is performed, for example, the resource determining method shown in any one of the embodiments in FIG. 4, FIG. 5A and FIG. 5B, and FIG. 8A and FIG. 8B is performed.

According to another aspect of embodiments of this application, an embodiment of this application further provides an electronic device, configured to perform the method described in any one of the foregoing embodiments, for example, configured to perform the resource determining method shown in any one of the embodiments in FIG. 4, FIG. 5A and FIG. 5B, and FIG. 8A and FIG. 8B.

FIG. 11 is a block diagram of an electronic device according to an embodiment of this application.

The electronic device is intended to represent various forms of digital computers, such as a laptop computer, a desktop computer, a workbench, a server, a blade server, a mainframe computer, and another suitable computer. The electronic device may alternatively represent various forms of mobile apparatuses, such as personal digital assistant, a cellular phone, a smartphone, a wearable device, and other similar computing apparatuses. Components shown in this specification, connections and relationships thereof, and functions thereof are merely examples, and are not intended to limit implementation of this application described and/or required in this specification.

For example, the electronic device may be a radar system, a telematics box (T-Box), a domain controller (DC), a multi-domain controller (MDC), an on board unit (OBU), an internet of vehicles chip, or the like that is disposed on a vehicle.

Specifically, the electronic device includes at least one processor 101, a communications bus 102, a memory 103, and at least one communications interface 104. The electronic device may be a general-purpose computer or server, or a dedicated computer or server.

The processor 101 may be a general-purpose central processing unit (CPU), a microprocessor, an application-specific integrated circuit (ASIC), or one or more integrated circuits configured to control program execution of the solutions in this application.

The communications bus 102 may include a path used to transmit information between the foregoing components.

The communications interface 104 may be any transceiver, any IP port, any bus interface, or the like, and is configured to communicate with an internal or external device, an apparatus, or a communications network, for example, an Ethernet, a radio access network (RAN), or a wireless local area network (WLAN). For example, when the electronic device is a functional unit integrated inside a vehicle, the communications interface 104 includes one or more of the following interfaces, for example, a transceiver for communication between the vehicle and an external network, and a bus interface (for example, a controller area network (CAN) bus interface) for communication between the vehicle and another internal unit.

The memory 103 may be a read-only memory (ROM), another type of static storage device that can store static information and instructions, a random access memory (RAM), or another type of dynamic storage device that can store information and instructions, or may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, or the like), a magnetic disk storage medium or another magnetic storage device, or any other medium that can be configured to carry or store expected program code in a form of an instruction or data structure and that can be accessed by a computer. The memory is not limited thereto. The memory may exist independently, and is connected to the processor by using the bus. Alternatively, the memory may be integrated with the processor.

The memory 103 is a non-transitory computer-readable storage medium provided in this application. The memory stores an instruction that can be executed by the at least one processor, so that the at least one processor performs the formation control method provided in this application. The non-transitory computer-readable storage medium according to this application stores computer instructions, and the computer instructions are used to enable a computer to perform the formation control method provided in this application.

As a non-transitory computer-readable storage medium, the memory 103 may be configured to store a non-transitory software program, a non-transitory computer-executable program, and a module. The processor 101 runs the non-transitory software program, the instructions, and the module that are stored in the memory 103, to execute various functional applications and data processing of the server, that is, implement the formation control method in the foregoing method embodiments.

The memory 103 may include a program storage area and a data storage area. The program storage area may store an operating system, an application program needed by at least one function, and the like. The data storage area may store data created based on use of the electronic device, and the like. In addition, the memory 103 may include a high-speed random access memory, and may further include a non-transitory memory such as at least one disk storage device, a flash memory device, or another non-transitory solid-state storage device. In some embodiments, the memory 103 may optionally include memories that are remotely disposed relative to the processor 101, and the remote memories may be connected to the electronic device over a network. Examples of the foregoing networks include but are not limited to the internet, the internet of vehicles, an enterprise intranet, a local area network, a mobile communications network, and a combination thereof.

During specific implementation, in an embodiment, the processor 101 may include one or more CPUs, for example, a CPU 0 and a CPU 1 in FIG. 11.

During specific implementation, in an embodiment, the electronic device may include a plurality of processors, for example, the processor 101 and a processor 108 in FIG. 11. Each of the processors may be a single-core (single-CPU) processor or a multi-core (multi-CPU) processor. The processor herein may be one or more devices, circuits, and/or processing cores configured to process data (for example, computer program instructions).

During specific implementation, in an embodiment, the electronic device may further include an output apparatus 105 and an input apparatus 106. The output apparatus 105 communicates with the processor 101, and may display information in a plurality of manners. For example, the output apparatus 105 may be a liquid crystal display (LCD), a light-emitting diode (LED) display apparatus, a cathode ray tube (CRT) display apparatus, a projector, or the like. The input apparatus 106 communicates with the processor 101, and may receive an input from a user in a plurality of manners. For example, the input apparatus 106 may be a mouse, a keyboard, a touchscreen apparatus, a sensing apparatus, or the like.

When the electronic device shown in FIG. 11 is a chip, a function/implementation process of the communications interface 104 may alternatively be implemented by using a pin, a circuit, or the like. The memory is a storage unit in the chip, for example, a register or a cache. The storage unit may alternatively be a storage unit located outside the chip.

According to another aspect of embodiments of this application, an embodiment of this application further provides a vehicle. The vehicle includes a vehicle body and a radar system, and further includes the resource determining apparatus described in any one of the foregoing embodiments, for example, includes the resource determining apparatus shown in FIG. 9 or FIG. 10.

It should be noted that, in some embodiments, the resource determining apparatus may be a part of components of the radar system. For example, the resource determining apparatus may be integrated into the radar system in a form of a chip.

The radar system may be installed on a motor vehicle, an uncrewed aerial vehicle, a railcar, a bicycle, a traffic light, a speed measurement apparatus, a network device (such as a base station or a terminal device in various systems), or the like. This application is applicable to a radar system between vehicles, and a radar system between a vehicle and another apparatus such as an uncrewed aerial vehicle, or a radar system between other apparatuses. For example, the radar system may be installed on an intelligent terminal such as an intelligent transportation device, a smart home device, or a robot. A type of a terminal device on which the radar system is installed, an installation location of the radar system, and a function of the radar system are not limited in this application.

FIG. 12 is a schematic diagram of a vehicle according to an embodiment of this application.

As shown in FIG. 12, the vehicle includes a processor 201, an external memory interface 202, an internal memory 203, a universal serial bus (USB) port 204, a power management module 205, an antenna 1, an antenna 2, a mobile communications module 206, a wireless communications module 207, a sensor 208, a camera 209, and a telematics box 210. It may be understood that the structure shown in this embodiment does not constitute a specific limitation on the vehicle.

The sensor 208 includes the radar system described in FIG. 12 and another sensor.

The resource determining apparatus may be disposed in the processor 201, or may be disposed in the telematics box 210, or may be disposed in the radar system. This is not limited in this embodiment.

In some other embodiments of this application, the vehicle may include more or fewer components than those shown in the figure, or combine some components, or split some components, or have different component arrangements. In addition, the components shown in the figure may be implemented by hardware, software, or a combination of software and hardware.

The processor 201 may include one or more processing units. For example, the processor 201 may include an application processor (AP), a modem processor, a graphics processing unit (GPU), an image signal processor (ISP), a controller, a video codec, a digital signal processor (DSP), a baseband processor, and/or a neural-network processing unit (NPU). Different processing units may be independent devices, or may be integrated into one or more processors. In some embodiments, the vehicle may alternatively include one or more processors 201. The processor 201 may be a nerve center and a command center of the vehicle. The processor 201 may generate an operation control signal based on an instruction operation code and a time sequence signal to control instruction reading and instruction executing. A memory may be further disposed in the processor 201, and is configured to store instructions and data. In some embodiments, the memory in the processor 201 is a cache.

In some embodiments, the processor 201 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a universal serial bus (USB) port, and/or the like. The USB port 211 is a port that conforms to a USB standard specification, and may be configured to connect to a charger to charge the vehicle.

It should be understood that various forms of processes shown above can be used to reorder, add, or delete steps. For example, the steps described in this application may be performed in parallel, or may be performed in sequence, or may be performed in different sequences, provided that an expected result of the technical solutions in this application can be implemented. This is not limited in this specification.

The foregoing specific implementations do not constitute any limitation on the protection scope of this application. A person skilled in the art should understand that various modifications, combinations, sub-combinations, and substitutions may be made based on design requirements and other factors. Any modification, equivalent replacement, and improvement made without departing from the spirit and principle of this application shall fall within the protection scope of this application.

What is claimed is:

1. A non-transitory computer-readable medium storing instructions that, when executed by one or more processors, cause the one or more processors to perform a resource determining method applied to an electronic device, the method comprising:

determining a first listening result of a first time-frequency resource set;

based on the first listening result meeting a first congestion condition, the method further comprising:

reducing a time-frequency occupation ratio and/or transmit power of a first target detection signal to obtain a second target detection signal, wherein the first congestion condition comprises: a congestion degree of any time-frequency resource in a second time-frequency resource set is greater than a first threshold, and the second time-frequency resource set is comprised in the first time-frequency resource set; and detecting a target based on the second target detection signal; and based on the first listening result not meeting the first congestion condition, the method further comprising:

determining a second listening result based on a third time-frequency resource set and a second listening signal, wherein the second listening signal comprises at least two waveforms, a congestion degree of any time-frequency resource in the third time-frequency resource set is greater than a second threshold and less than the first threshold, and the third time-frequency resource set is comprised in the first time-frequency resource set;

determining, based on the second listening result, a waveform that is least interfered with among the at least two waveforms; and determining, based on the waveform that is least interfered with, a detection signal used to detect the target.

2. The non-transitory computer-readable medium according to claim 1, causing the one or more processors to perform the method that further comprises:

determining whether the first listening result meets a second congestion condition, wherein the second congestion condition comprises: a congestion degree of any time-frequency resource in the first time-frequency resource set is greater than the second threshold.

3. The non-transitory computer-readable medium according to claim 1, causing the one or more processors to perform the method that further comprises:

determining a first listening signal; and wherein the determining the first listening result of the first time-frequency resource set comprises: generating the first listening result based on the first time-frequency resource set and the first listening signal, wherein the first listening signal comprises a plurality of waveforms, and signal models of the plurality of waveforms are different.

4. The non-transitory computer-readable medium according to claim 3, wherein the signal models comprise frequency modulation slopes and/or system types of the plurality of waveforms.

5. The non-transitory computer-readable medium according to claim 4, wherein density of the plurality of waveforms in a time-frequency resource area corresponding to the first time-frequency resource set is greater than a preset density threshold.

6. The non-transitory computer-readable medium according to claim 5, wherein the density comprises time density and/or frequency density, the preset density threshold comprises a time density threshold and/or a frequency density threshold, and wherein the density of the plurality of waveforms in the time-frequency resource area corresponding to the first time-frequency resource set is greater than the preset density threshold is satisfied by at least one of:

the time density is greater than the time density threshold; or the frequency density is greater than the frequency density threshold.

7. The non-transitory computer-readable medium according to claim 5, wherein a signal model of at least one of the plurality of waveforms changes with time.

8. The non-transitory computer-readable medium according to claim 1, wherein the time-frequency occupation ratio comprises a duty cycle of the first target detection signal in time and/or an occupation ratio of the first target detection signal in frequency.

9. The non-transitory computer-readable medium according to claim 1, causing the one or more processors to perform the method that further comprises:

selecting at least some time-frequency resources from the first time-frequency resource set according to a preset selection rule, to determine the second time-frequency resource set, wherein the selection rule comprises: at least some time-frequency resources are selected from the first time-frequency resource set based on a preset selection parameter, and a congestion degree of any selected time-frequency resource is less than a congestion degree of an unselected time-frequency resource.

10. An apparatus comprising:

a memory configured to store instructions; and a processor coupled to the memory and configured to execute the instructions to cause the apparatus to:

determine a first listening result of a first time-frequency resource set;

based on the first listening result meeting a first congestion condition, the apparatus further configured to:

reduce a time-frequency occupation ratio and/or transmit power of a first target detection signal to obtain a second target detection signal, wherein the first congestion condition comprises: a congestion degree of any time-frequency resource in a second time-frequency resource set is greater than a first threshold, and the second time-frequency resource set is comprised in the first time-frequency resource set; and detect a target based on the second target detection signal, and based on the first listening result not meeting the first congestion condition, the apparatus further configured to:

determine a second listening result based on a third time-frequency resource set and a second listening signal, wherein the second listening signal comprises at least two waveforms, a congestion degree of any time-frequency resource in the third time-frequency resource set is greater than a second threshold and less than the first threshold, and the third time-frequency resource set is comprised in the first time-frequency resource set;

determine, based on the second listening result, a waveform that is least interfered with among the at least two waveforms; and determine, based on the waveform that is least interfered with, a detection signal used to detect the target.

11. The apparatus according to claim 10, wherein the instructions further cause the apparatus to:

determine whether the first listening result meets a second congestion condition, wherein the second congestion condition comprises: a congestion degree of any time-frequency resource in the first time-frequency resource set is greater than the second threshold.

12. The apparatus according to claim 10, wherein the instructions further cause the apparatus to:

determine a first listening signal; and wherein the determining the first listening result of the first time-frequency resource set comprises: generating the first listening result based on the first time-frequency resource set and the first listening signal, wherein the first listening signal comprises a plurality of waveforms, and signal models of the plurality of waveforms are different.

13. The apparatus according to claim 12, wherein the signal models comprise frequency modulation slopes and/or system types of the plurality of waveforms.

14. The apparatus according to claim 13, wherein density of the plurality of waveforms in a time-frequency resource area corresponding to the first time-frequency resource set is greater than a preset density threshold.

15. The apparatus according to claim 14, wherein the density comprises time density and/or frequency density, the preset density threshold comprises a time density threshold and/or a frequency density threshold, and wherein the density of the plurality of waveforms in the time-frequency resource area corresponding to the first time-frequency resource set is greater than the preset density threshold is satisfied by at least one of:

the time density is greater than the time density threshold; or the frequency density is greater than the frequency density threshold.

16. The apparatus according to claim 13, wherein a signal model of at least one of the plurality of waveforms changes with time.

17. The apparatus according to claim 10, wherein the time-frequency occupation ratio comprises a duty cycle of the first target detection signal in time and/or an occupation ratio of the first target detection signal in frequency.

18. The apparatus according to claim 10, further configured to:

select at least some time-frequency resources from the first time-frequency resource set according to a preset selection rule, to determine the second time-frequency resource set, wherein the selection rule comprises: at least some time-frequency resources are selected from the first time-frequency resource set based on a preset selection parameter, and a congestion degree of any selected time-frequency resource is less than a congestion degree of an unselected time-frequency resource.

\* \* \* \* \*